US011085600B2

(12) United States Patent
Casement et al.

(10) Patent No.: US 11,085,600 B2
(45) Date of Patent: *Aug. 10, 2021

(54) T-BAR LIGHTING ASSEMBLY

(71) Applicant: ARON Lighting LLC, Conshohocken, PA (US)

(72) Inventors: Josh Casement, Salem, NH (US); Clay Mohrman, Duxbury, MA (US); Jeffrey Corvese, Cumberland, RI (US); Terence Yeo, Boston, MA (US); Timothy Kelly, Brookline, MA (US)

(73) Assignee: ARON Lighting LLC, Conshohocken, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/997,171

(22) Filed: Aug. 19, 2020

(65) Prior Publication Data

US 2020/0378568 A1 Dec. 3, 2020

Related U.S. Application Data

(63) Continuation of application No. 14/986,565, filed on Dec. 31, 2015, now Pat. No. 10,808,896.

(Continued)

(51) Int. Cl.
*F21V 7/04* (2006.01)
*F21S 8/02* (2006.01)
(Continued)

(52) U.S. Cl.
CPC ............. *F21S 8/026* (2013.01); *E04B 9/067* (2013.01); *E04B 9/18* (2013.01); *F21S 8/061* (2013.01);
(Continued)

(58) Field of Classification Search
CPC .. F21S 8/026; F21S 8/061; F21S 8/063; F21S 8/04; G02B 6/0078; G02B 1/045;
(Continued)

(56) References Cited

U.S. PATENT DOCUMENTS 3,078,366 A 2/1963 Winkler
3,502,860 A 3/1970 Boake
(Continued)

FOREIGN PATENT DOCUMENTS

EP 2650599 A1 10/2013

OTHER PUBLICATIONS

Defendant Opus Innovation LLC's Initial Invalidity Contentions regarding U.S. Pat. No. 10,808,896, served May 20, 2021, United States District Court for the Eastern District of Pennsylvania, Civil Action No: 2:20-cv-06491-AB.

*Primary Examiner* — William J Carter
*Assistant Examiner* — Omar Rojas Cadima
(74) *Attorney, Agent, or Firm* — Duane Morris LLP

(57) ABSTRACT

A lighting assembly is provided that includes a light fixture in combination with a support grid such as a drop ceiling t-bar. The light fixture can be configured to use a t-bar as the main form of support. The light fixture can be push-fit onto a t-bar or use a clip to join two or more portions of the light fixture to an installed t-bar. Once attached to the T-bar, the light fixture itself can provides support for a ceiling tile. Various embodiments are provided which achieve a variety of light distributions useful in typical illumination applications. Both recessed and suspended fixture types are achieved in various embodiments which are particularly well suited for LED lighting.

43 Claims, 15 Drawing Sheets

Related U.S. Application Data

(60) Provisional application No. 62/099,089, filed on Dec. 31, 2014.

(51) Int. Cl.

| | | |
|---|---|---|
| *F21V 8/00* | (2006.01) | |
| *F21V 15/01* | (2006.01) | |
| *F21S 8/06* | (2006.01) | |
| *F21V 21/008* | (2006.01) | |
| *F21V 21/04* | (2006.01) | |
| *E04B 9/06* | (2006.01) | |
| *E04B 9/18* | (2006.01) | |
| *G02B 1/04* | (2006.01) | |
| *E04B 9/00* | (2006.01) | |
| *F21Y 115/10* | (2016.01) | |

(52) U.S. Cl.
CPC .......... *F21V 15/013* (2013.01); *F21V 21/008* (2013.01); *F21V 21/049* (2013.01); *G02B 1/045* (2013.01); *G02B 6/0038* (2013.01); *G02B 6/0041* (2013.01); *G02B 6/0046* (2013.01); *G02B 6/0051* (2013.01); *G02B 6/0055* (2013.01); *G02B 6/0078* (2013.01); *E04B 9/006* (2013.01); *F21Y 2115/10* (2016.08)

(58) Field of Classification Search
CPC .. G02B 6/0041; G02B 6/0038; G02B 6/0051; G02B 6/0046; G02B 6/0055; G02B 6/0045; G02B 6/0011; G02B 6/0028; F21V 21/008; F21V 21/049; F21V 2200/20; F21V 21/048; E04B 9/067; E04B 9/18; E04B 9/006; E04B 9/241; F21Y 2115/10; F21K 9/61
USPC .. 362/606, 147, 223, 217.03, 217.05, 217.1, 362/217.14, 364, 367, 368
See application file for complete search history.

(56) References Cited

U.S. PATENT DOCUMENTS

| | | |
|---|---|---|
| 5,408,363 A | 4/1995 | Kano |
| 5,709,460 A | 1/1998 | Lester |
| 5,777,857 A | 7/1998 | Degelmann |
| 6,029,414 A | 2/2000 | MacLeod |
| 7,392,629 B1 | 7/2008 | Bankston |
| 8,596,009 B2 | 12/2013 | Baxter et al. |
| 8,646,941 B1 | 2/2014 | McKenna et al. |
| 8,702,264 B1 | 4/2014 | Rashidi |
| 9,595,845 B2 | 3/2017 | McBryde et al. |
| 10,278,250 B2 | 4/2019 | McBryde et al. |
| 2002/0141181 A1 | 10/2002 | Bailey |
| 2004/0213003 A1 | 10/2004 | Lauderdale et al. |
| 2008/0087464 A1 | 4/2008 | Patterson |
| 2010/0254121 A1* | 10/2010 | Zhou ............... G02B 6/0055 362/147 |
| 2010/0315833 A1 | 12/2010 | Holman |
| 2011/0175533 A1 | 7/2011 | Holman |
| 2013/0294061 A1 | 11/2013 | Sorensen |
| 2014/0071665 A1 | 3/2014 | Huang |
| 2015/0138779 A1 | 5/2015 | Livesay |
| 2016/0116136 A1* | 4/2016 | Bernard ............... F21S 8/026 362/150 |
| 2017/0082253 A1 | 3/2017 | Sorensen et al. |

* cited by examiner

T-BAR LIGHTING ASSEMBLY

CROSS REFERENCE TO RELATED APPLICATIONS

This application is a continuation application of U.S. patent application Ser. No. 14/986,565 filed Dec. 31, 2015, which claims the benefit of provisional patent application Ser. No. 62/099,089 titled "T-bar Lighting Assembly" filed Dec. 31, 2014, the entirety of each of which is hereby incorporated by reference herein.

BACKGROUND

The invention relates to the use of a T-bar integrated with a light fixture as well as being an integral part of the suspended ceiling system for a building or other structure. In drop ceiling environments such as office space and residential homes the t-bar is a support grid that holds ceiling tiles in place in order to form a drop ceiling.

SUMMARY

A lighting assembly is provided which comprises a light fixture in combination with a support grid such as a drop ceiling t-bar. The light fixture can be configured to use a t-bar as the main form of support. The light fixture can be push-fit onto a t-bar or use a clip to join two or more portions of the light fixture to an installed t-bar. The push fit option is a modular shape designed to fit a variety of different t-bars. Clips are designed to attach specific light fixture components to standard t-bar shapes.

The light fixture can also be configured to act as a t-bar itself and provides support for a ceiling tile to rest upon. A ceiling tile resting on the t-bar can be configured to sit flat and in parallel with the other ceiling tiles.

BRIEF DESCRIPTION OF FIGURES

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
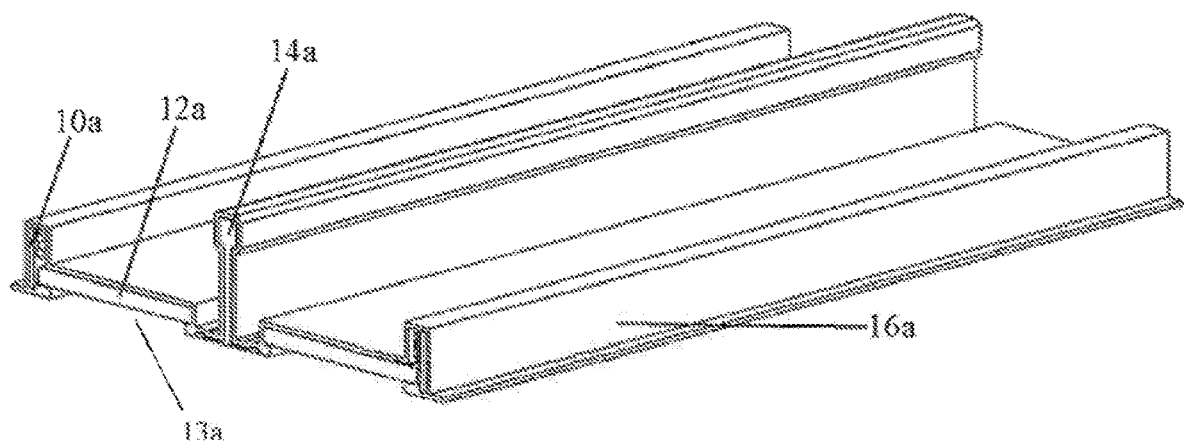
FIG. 1 is a perspective view of "embodiment a" lighting assembly.

FIG. 1 is a perspective view of lighting assembly "embodiment a". A LED board 10a, which serves as a light source, and light guide 12a have been inserted into the housing, extrusion 16a. The conformal shape of the extrusion 16a mates with and is held in place by the t-bar 14a. In this manner, a light fixture (everything in FIG. 1 except the t-bar 14a), can be mounted onto a t-bar 14a without the use of fasteners.

Figure 2A:
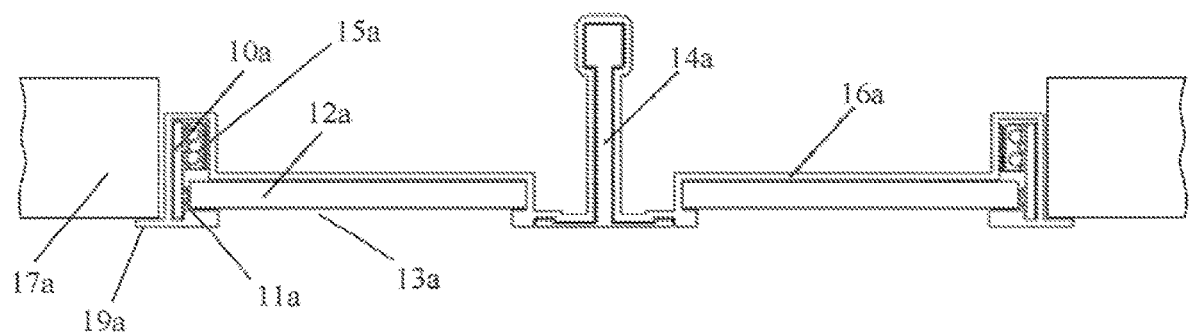
FIG. 2A is a cross-section view of lighting assembly "embodiment a".

FIG. 2A is a cross-section view of lighting assembly "embodiment a". The housing, extrusion 16a, is mated with and supported by the t-bar 14a. This fixture uses an edge lit lighting configuration wherein light from the LEDs 11 on the LED board 10a is input into the edge of the light guide 12a and the output face of the light guide becomes the light emitting surface 13a of the fixture. In a typical embodiment the inside surface of the extrusion 16a will have an optically reflective surface such as a white paint to enhance optical efficiency of the lighting assembly.

"Embodiment a" is a recessed embodiment wherein the housing rests on the t-bar and is mounted flush with a ceiling tile 17a that is supported by a ledge 19a on the edge of the housing. 15a is an electrical connector through which electrical power is distributed to the LED board from a power source such as an LED driver which could be mounted onto the lighting assembly housing or located remotely and connected by wiring.

Figure 3:
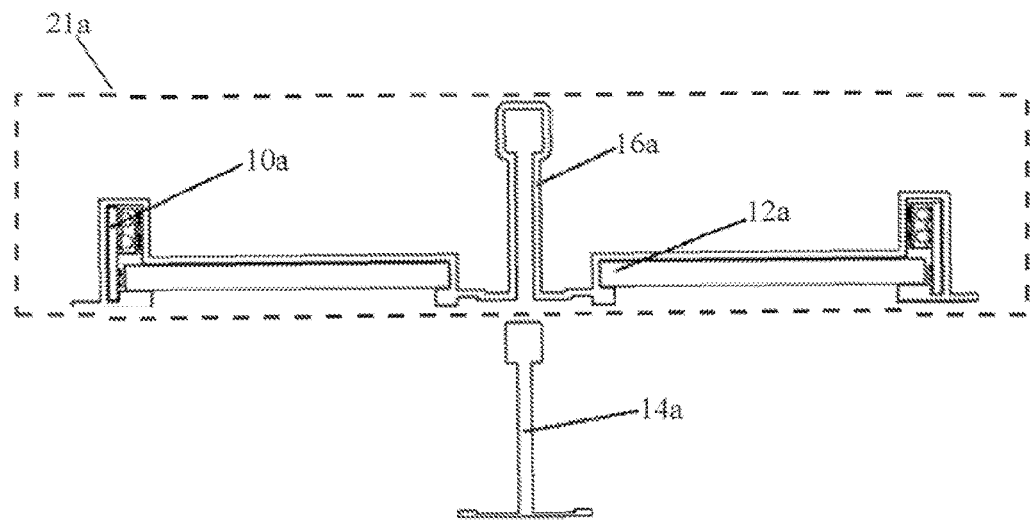
FIG. 3 is a view of the lighting assembly "embodiment a" showing separated light fixture and t-bar.

FIG. 3 is a view of the lighting assembly "embodiment a" wherein the light fixture 21 is shown separated from the t-bar 14a. This view illustrates how the extrusion 16a mimics the shape of the t-bar to create a conformal flush fit. During installation the light fixture 21 attaches to and is supported by the t-bar 14a.

Figure 4:
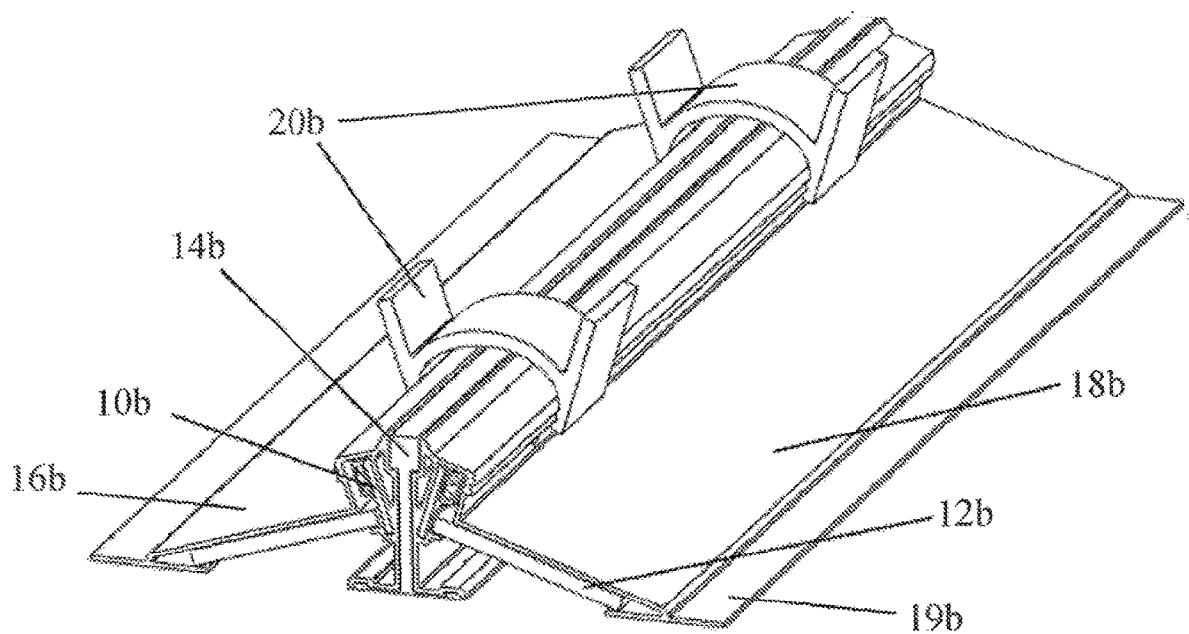
FIG. 4 is a perspective view of a lighting assembly "embodiment b" in which two halves of a light fixture housing are joined onto a t-bar by clips.

FIG. 4 is a perspective view of a lighting assembly "embodiment b" wherein the housing is comprised of two extrusions 16b and 18b which are joined to the t-bar 14b by use of a clip 20b. For an assembled fixture that is 1' long for example, two clips 20b could be used to attach two extrusions together. Here, each extrusion 16b and 18b is fully assembled into light fixture halves then attached at an installation site to an opposing extrusion using clips 20b. For installation, ceiling tile on each side of the assembly can be is cut to mount onto the extrusion ledge 19b.

Figure 5A:
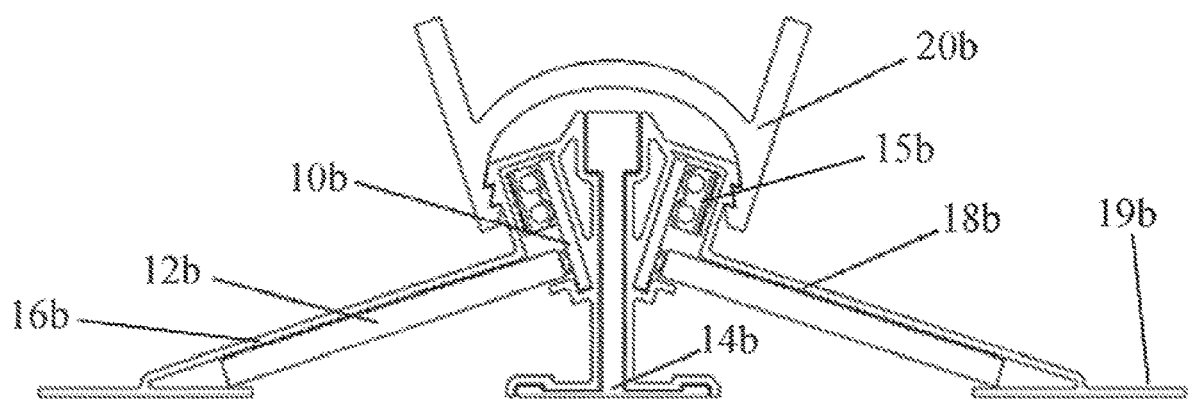
FIG. 5A is a cross-section view of a lighting assembly "embodiment b" in which two halves of a light fixture housing are joined onto a t-bar by clips.

FIG. 5A is a cross-section view of a lighting assembly "embodiment b" wherein the housing is comprised of two extrusions 16b and 18b which are joined to the t-bar 14b by use of a clip 20b. 15b is an electrical connector through which electrical power is distributed to the LED board from a power source such as an LED driver which could be mounted onto the lighting assembly housing or located remotely and connected by wiring.

Figure 6:
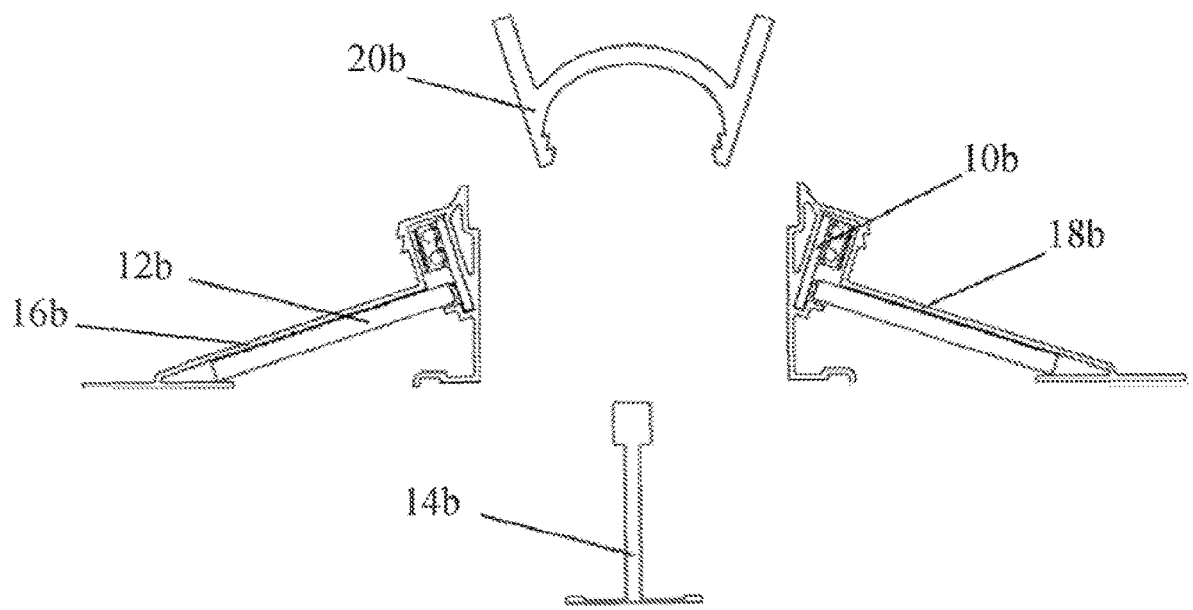
FIG. 6 is a cross-section view of a partially disassembled "embodiment b" lighting assembly.
Figure 7:
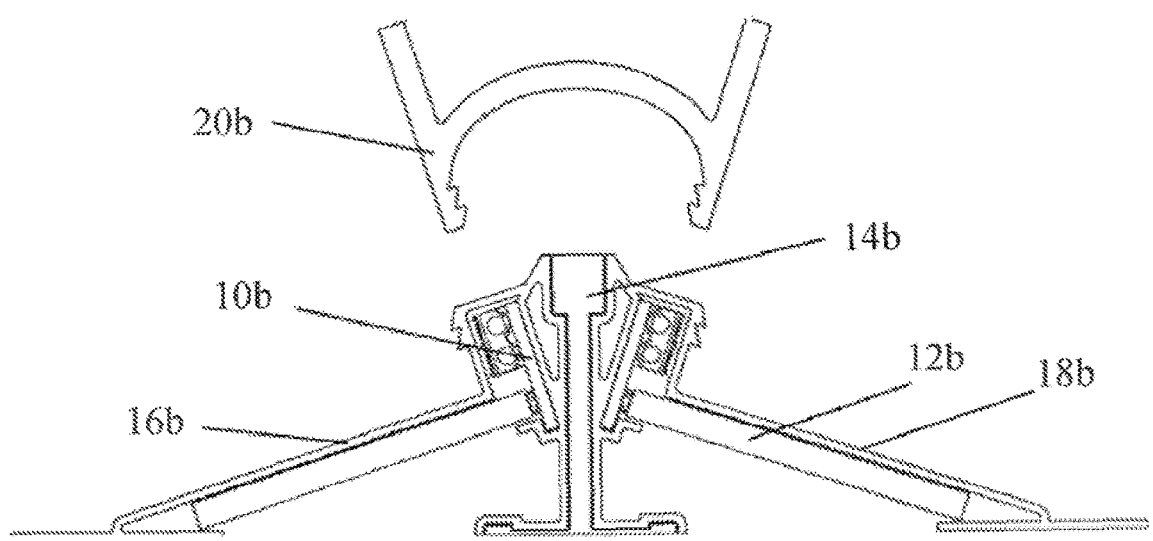
FIG. 7 is a perspective view of a partially disassembled "embodiment b" lighting assembly.

FIG. 6 and FIG. 7 are views of a partially disassembled "embodiment b" lighting assembly which show the separate sections that are assembled into the finished lighting assembly; the two light fixture halves formed from extrusion 16b and 18b, clip 20b, and t-bar 14b. The clip 20b contains small grooves on it to allow for a tight locking fit.

Figure 8A:
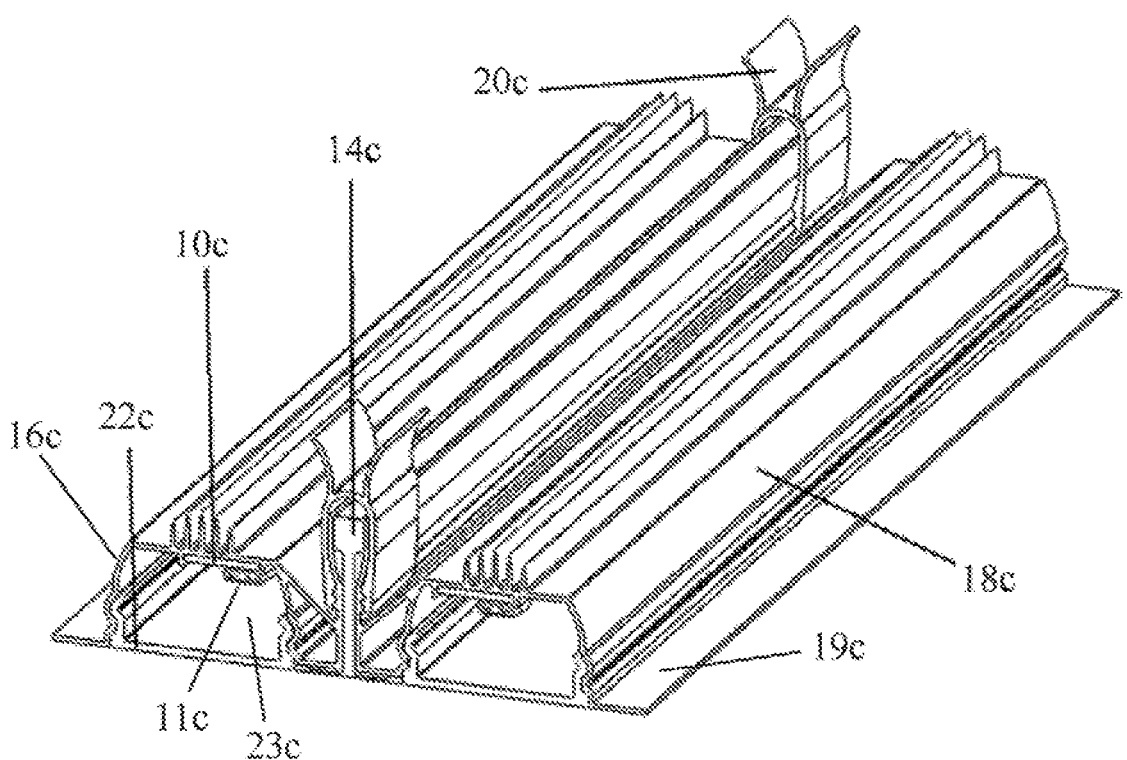
FIG. 8A shows a perspective view of a direct lit lighting assembly "embodiment c".
Figure 8B:
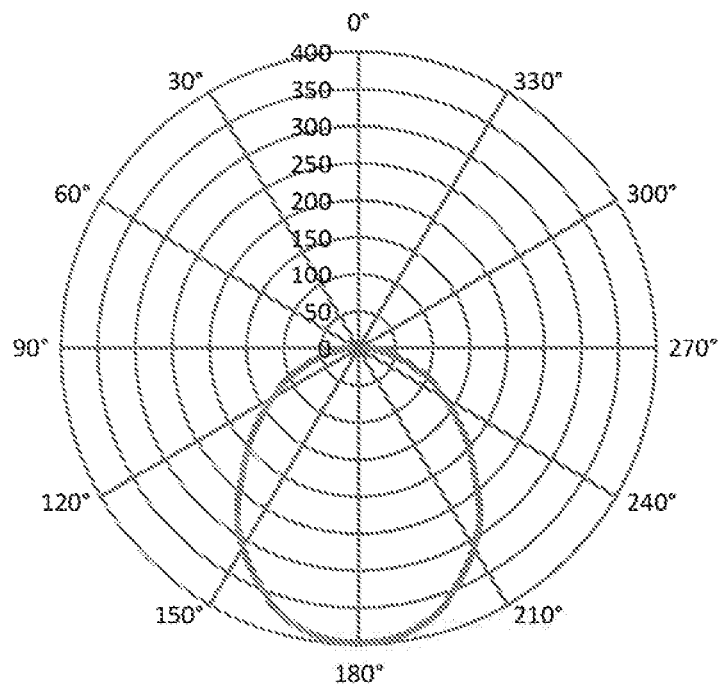
FIG. 8B is a measured light distribution polar plot of the "embodiment c" lighting assembly of FIG. 8A.

Lighting assembly "embodiment c" of FIG. 8A is a direct lit configuration which provides a light distribution with peak intensity normal to the fixture. Two halves of the light fixture, extrusion 16c and extrusion 18c, are joined onto the t-bar 14c, by clips 20c. LEDs 11 populate each LED board 10c from which light is emitted and dispersed into the reflective chamber 23c before exiting the lighting assembly through a diffuser lens 22c. Ledges 19c on both sides of the housing provide a resting place for ceiling tile. In addition to scattering light, a diffusion lens may be used in both direct lit and edge lit optical systems to reduce glare if it contains light directing surface features. Examples include but are not limited to geometric shapes such as half spheres, pyramids, truncated pyramids, lenticulars, and linear prisms.

Figure 2B:
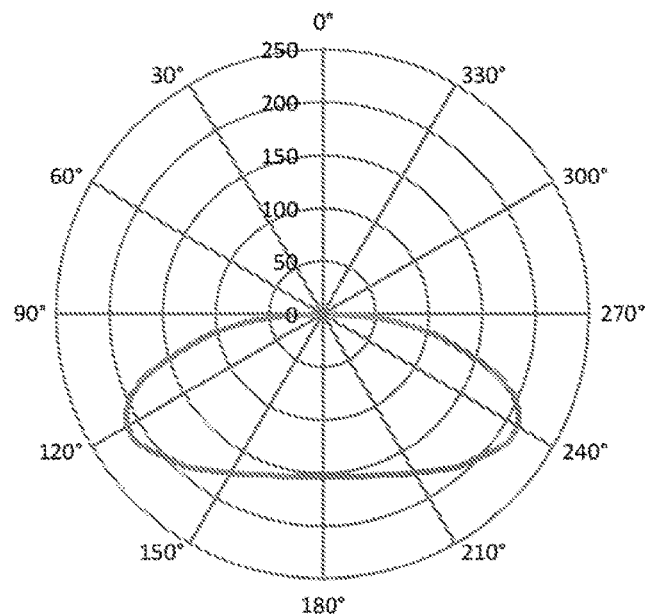
FIG. 2B is a measured intensity vs. angle light distribution polar plot from lighting assembly "embodiment a".
Figure 9A:
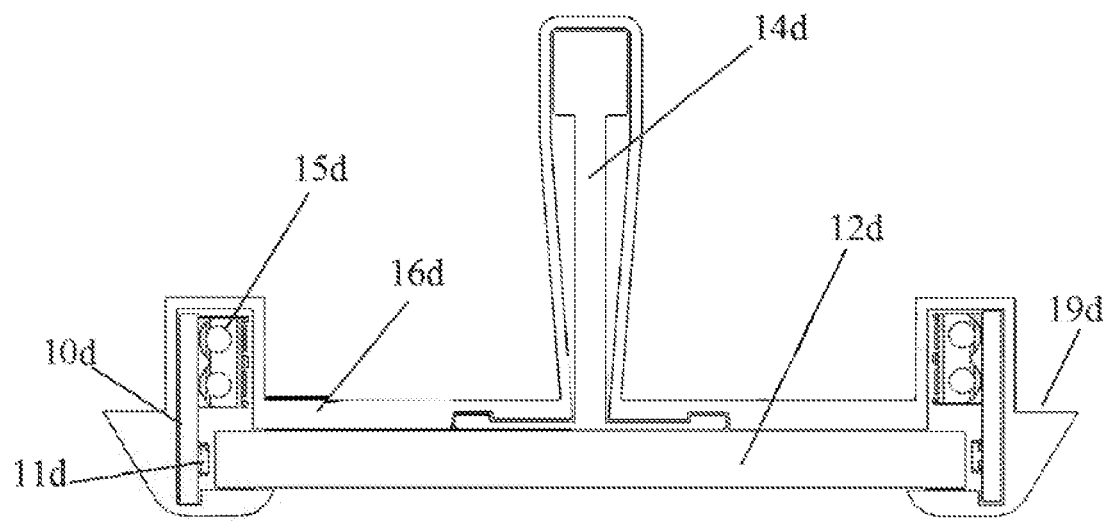
FIG. 9A shows a cross-section view of an edge lit lighting assembly "embodiment d" with a single light guide edge lit from two opposing sides.
Figure 9B:
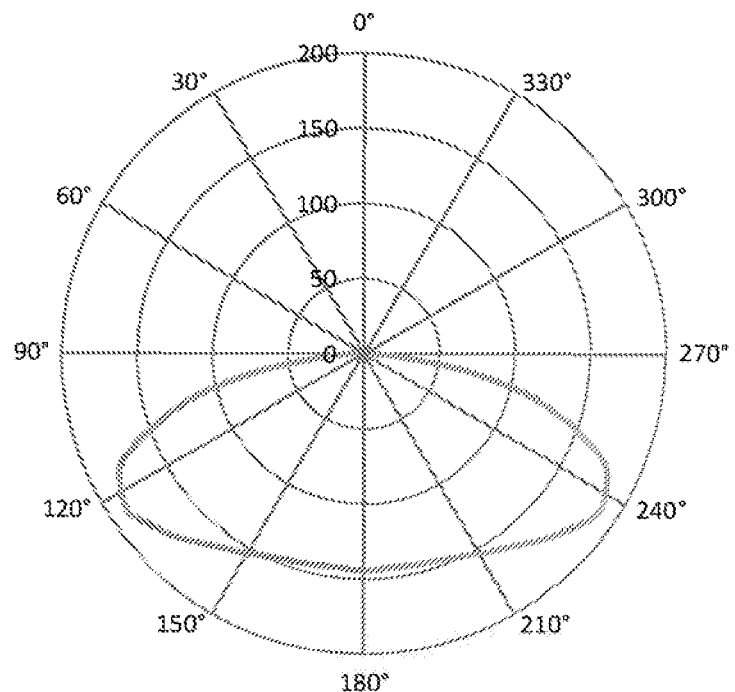
FIG. 9B is a measured light distribution polar plot of the "embodiment d" lighting assembly of FIG. 9A.

Lighting assembly "embodiment d" of FIG. 9A contains a single light guide 12d lit from two opposing edges by LEDs 11d mounted on LED boards 10c and provides a wide angle lobed light distribution similar to the "embodiment a" of FIG. 2 but with more light normal to the fixture. The extrusion 16d serves as a housing which has a t-bar shaped section that conforms to the shape of the t-bar 14d; the two mating together to hold the assembly in place upon the t-bar 14d. Ledges 19d provide support for ceiling tile and power is supplied via electrical connecters 15d.

Figure 10A:
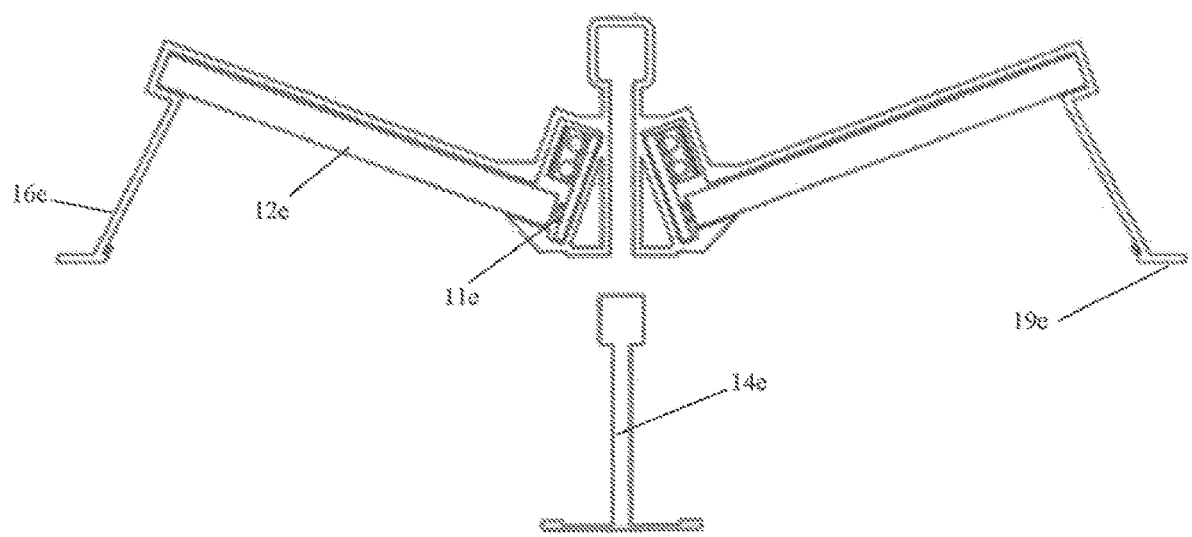
FIG. 10A shows a cross-section view of an edge lit lighting assembly "embodiment e" with angled light guides.
Figure 10B:
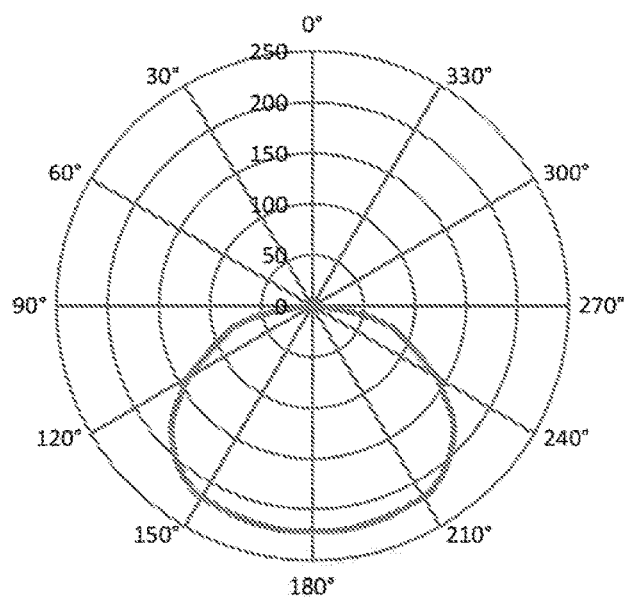
FIG. 10B is a measured light distribution polar plot of the "embodiment e" lighting assembly of FIG. 10A.

Lighting assembly "embodiment e" of FIG. 10A has two light guides 12e, each lit from the inside edge by LEDs 11e and tilted upward which produces a light distribution with even peak intensity over the range ±30° from normal as seen in FIG. 10B. The tilted light guides 12e provide for a design in which the side of the extrusion 16e acts as a reflector and baffle in narrowing the light distribution and preventing glare.

Figure 11A:
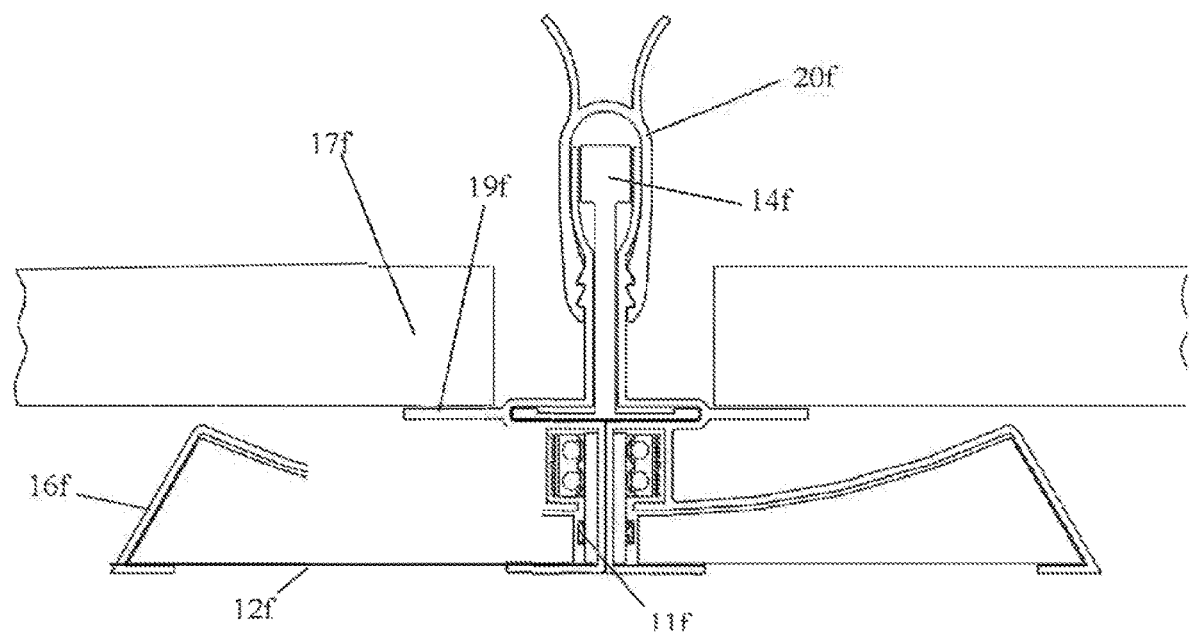
FIG. 11A shows a cross-section view of an edge lit lighting assembly "embodiment f" with two edge lit light guide, each lit from the center edge.
Figure 11B:
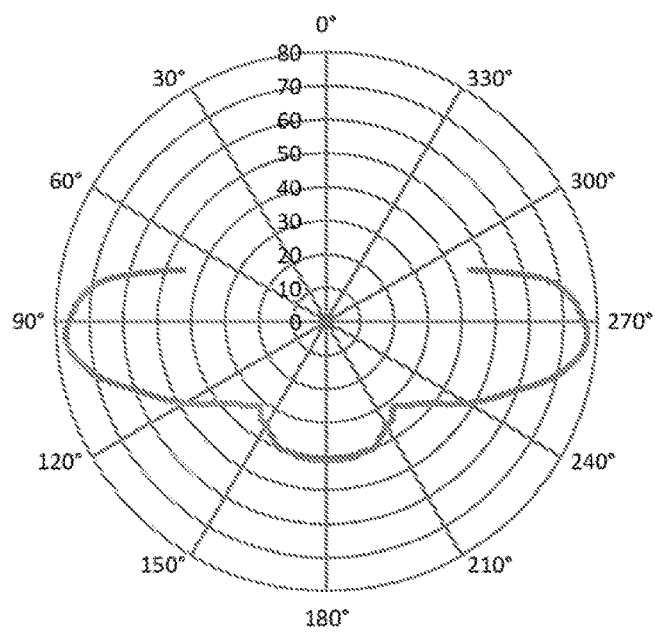
FIG. 11B is a measured light distribution polar plot of the "embodiment f" lighting assembly of FIG. 11A.

The lighting assembly "embodiment f" of FIG. 11A contains two light guides 12f each lit from the inside edge by LEDs 11f and shaped with flared edges that provide an extreme wide angle light distribution with 2 major lobes at ±90° from normal and a weaker minor lobe normal to the fixture. "Embodiment f" is a configuration which is not recessed within the ceiling but rather the significant portion of the housing extrusion 16f is suspended below the ceiling tile 17f which is supported by the ledge 19f. The clip 20f hold the housing extrusion together on the t-bar 14f.

Figure 12:
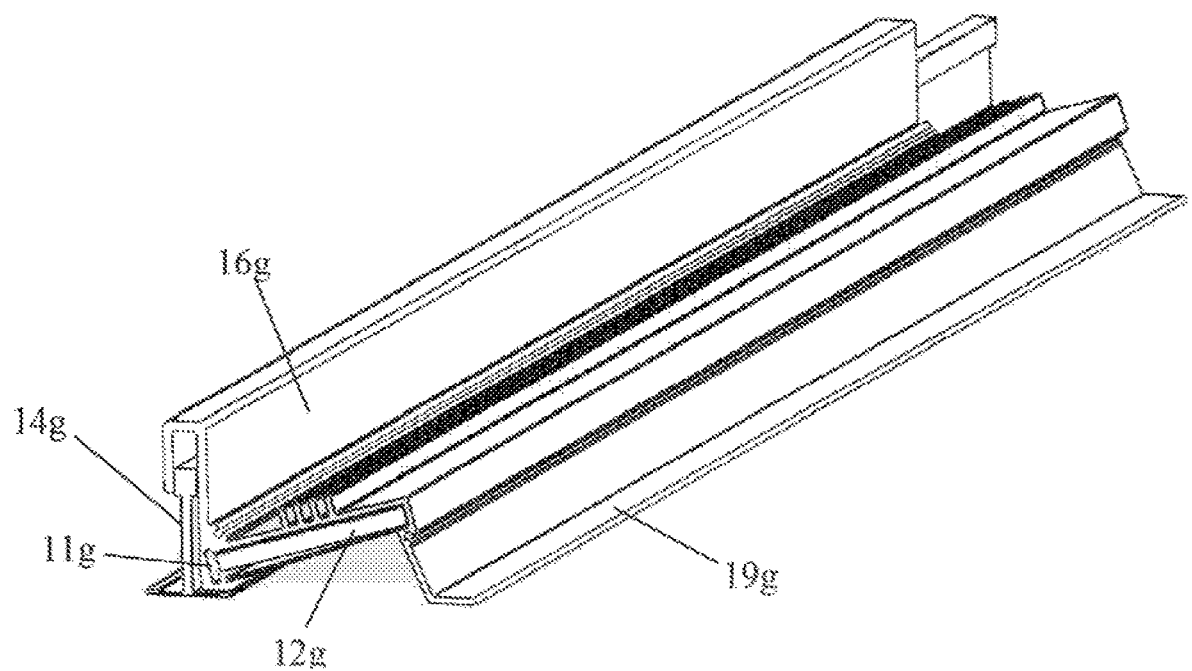
FIG. 12 is a perspective view of an asymmetric lighting assembly "embodiment g" with a single edge lit light guide.
Figure 13A:
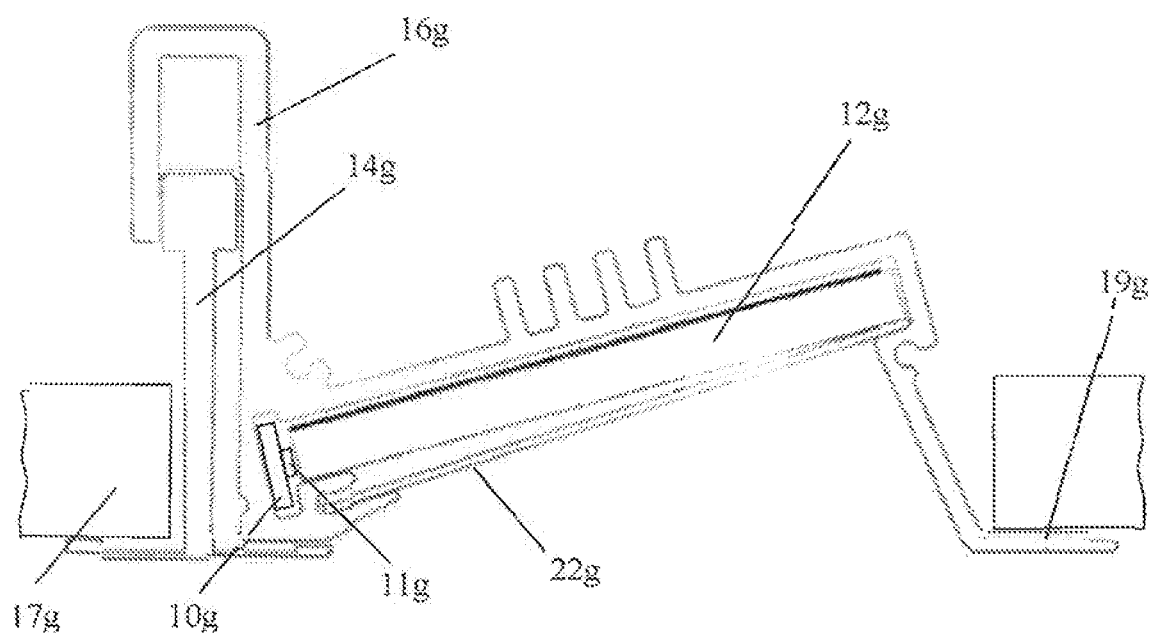
FIG. 13A is a cross-section view of lighting assembly "embodiment g" with a single edge lit light guide.

FIG. 12 is a perspective view of asymmetric lighting assembly "embodiment g" with a single edge lit light guide. The housing extrusion 16g mates with the t-bar 14g which holds it in place. FIG. 13A is a cross-section view of lighting assembly "embodiment g" which details the configuration.

Figure 13B:
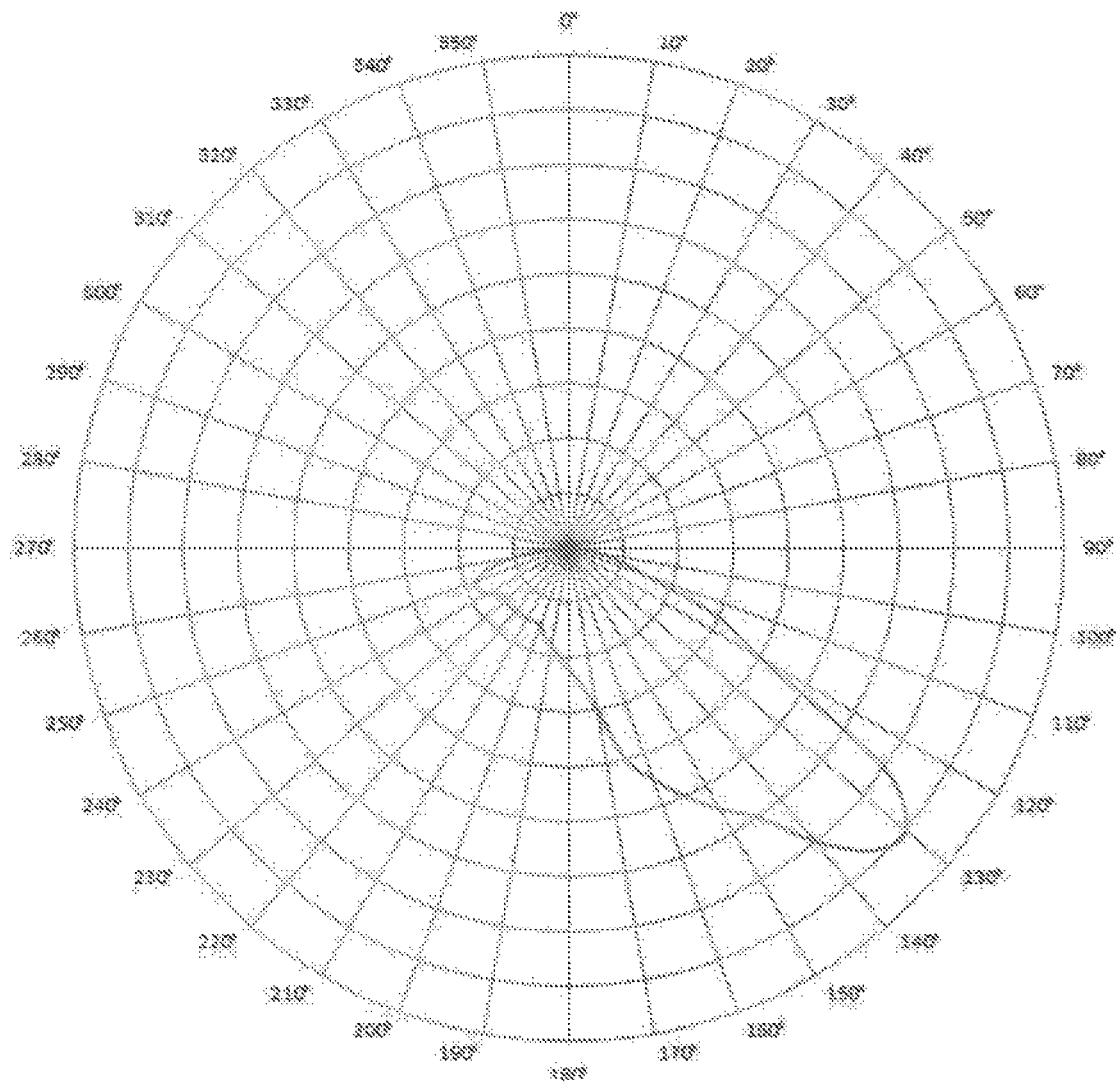
FIG. 13B is a measured light distribution polar plot of the embodiment lighting assembly "embodiment g" of FIG. 13A.
Figure 14:
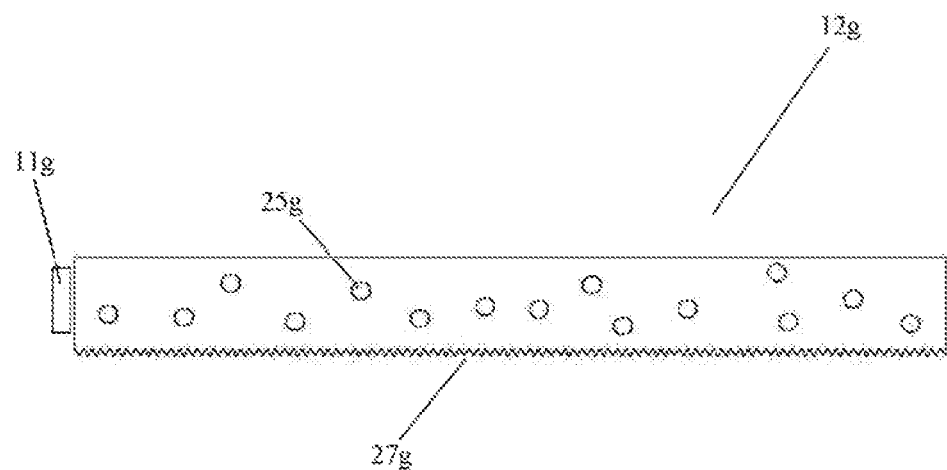
FIG. 14 is a cross-section view of "embodiment g" light guide having a light diffusing volume and light directing features.

FIG. 13A is a cross-section view of lighting assembly "embodiment g" with a single edge lit light guide. Both the fixture mechanical design and the light output distribution in FIG. 13B polar plot of intensity vs. angle are asymmetric making this embodiment optimal for applications such as wall washing, wall grazing, and cove lighting. The ledge 19g of the housing extrusion 16g supports ceiling tile 17g in a recessed ceiling fit. Light from LEDs 11g on the LED board 10g is input into the light guide 12g and then propagates through the diffusing lens 22g before exiting the lighting assembly. The diffusing lens 22g is slightly angled with respect to the light guide to provide some offset distance near the input side to improve the spatial uniformity of light distribution but closer to the light guide 12h near the opposing edge to increase optical efficiency. Alternatively, the diffusing lens 22g could be a component with light directing surface features to reduce glare and/or change light distribution patterns. FIG. 14 illustrates optical detail of the "embodiment g" light guide 12g which is primarily polymethyl methacrylate (PMMA) but contains a <2% concentration of polymer microbeads 25 having a refractive index differing from that of the bulk PMMA, thus producing a volumetric diffuser and inducing some light scattering and helping to out couple light from the light guide. The light guide 12g also consists of light directing surface features 27 in the specific form of linear ridges located on the output face which act to produce light outcoupling and the specific light distribution seen if FIG. 13B. As an alternative to polymer microbeads for producing volumetric diffusion, other micro-regions of differing refractive index could be utilized to induce light scattering. Examples include white reflective powders such as Ti02 or micro-regions of differing refractive index formed by immiscible blending of polymer materials.

Figure 15:
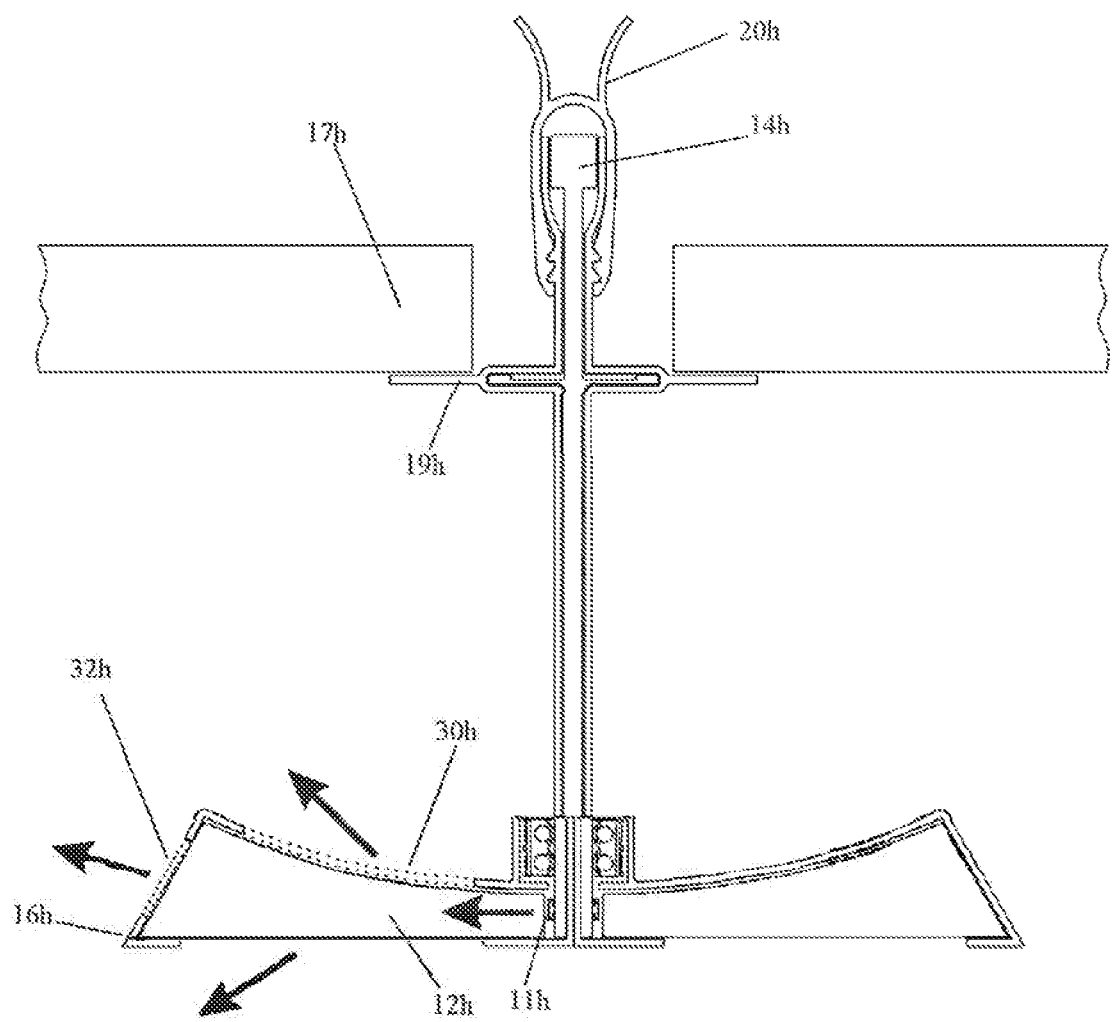
FIG. 15 is a cross-section view of lighting assembly "embodiment h", with suspended light fixture.

FIG. 15 is a cross-section view of lighting assembly "embodiment h" in which the light fixture portion of the assembly is suspended below the ceiling tile 17h by means of an extended housing. Alternatively, the bottom portion of the housing could be suspended by cable connected to the upper portion. The housing 16h is mated to the t-bar 14h to hold the lighting assembly in place. A ledge 19h supports ceiling tile 17h. Light from LEDs 11 enters the input edge of the light guide and is propagated within the light guide with some light exiting bottom, top, and side of the housing 16h. Portions of light exiting through the top and side exit through though the top aperture 30h and side aperture 32h respectively. In this way a suspended direct/indirect light fixture integrated with a ceiling t-bar can be achieved. The multiple paths of light propagation are illustrated in FIG. 15 with arrows.

FIG. 2B, FIG. 5B, FIG. 8B, FIG. 9B, FIG. 11B, FIG. 11B, and FIG. 13B show measured intensity vs. angle light distribution polar plots of embodiment lighting assemblies of FIG. 2A, FIG. 5A, FIG. 8A, FIG. 9A, FIG. 10A, FIG. 11A, and FIG. 13B respectively and illustrate some of the wide range of light distributions possible with various embodiment configurations. The two light guides in the embodiment of FIG. 2A, each lit from the outside edge, provide a fairly wide light distribution with higher intensity lobes centered at approximately ±60° from normal (straight down for a ceiling mounted fixture).

Figure 5B:
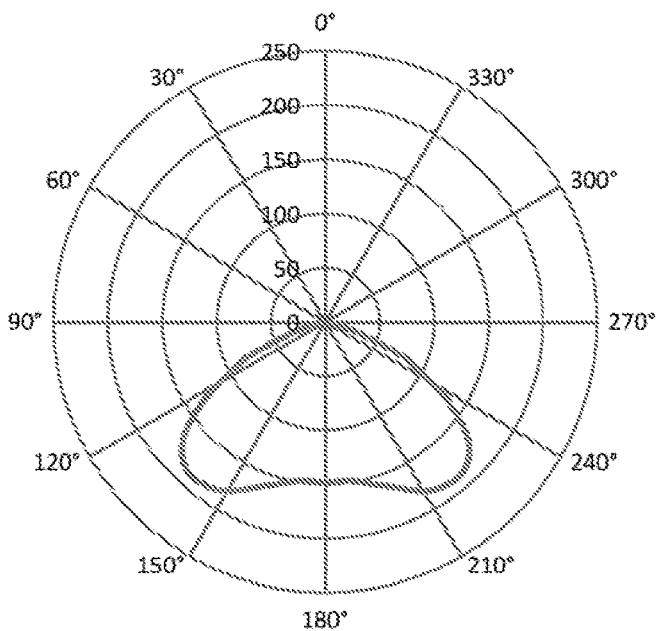
FIG. 5B is a measured intensity vs. angle light distribution polar plot from lighting assembly "embodiment b".

The embodiment of FIG. 5A has two light guides, each lit from the inside edge and tilted to narrow the light distribution and provide higher intensity lobes at approximately ±40° from normal (straight down for a ceiling mounted fixture). A light distributions such as that shown in FIG. 5B is commonly referred to as bat wing light distribution and is considered very desirable in many illumination applications where the illuminance field projected onto a flat surface from an overhead light fixture is optimally uniform in intensity. The lobes in the light distribution facilitate this by projecting more light off axis from the light fixture to compensate for the greater distance needed to reach the illuminated surface at angles away from normal directly below the fixture.

Embodiments "b" and "e" shown in FIG. 5A/5B and FIG. 10A/10B illustrate that changing the orientation of light guides changes the output light distribution. By providing means for tilting light guides within the lighting assembly, a lighting assembly of adjustable light distribution can be produced. Furthermore, addition of electronics capable of receiving a control signal and an electromechanical motor can be used to remotely adjust the light distribution. When mounted into a room ceiling, embodiment lighting assemblies can provide adjustment of light distribution without noticeable change from an observer within the room.

In general, embodiments of have been shown to provide a wide variety of non-lambertian light distributions that are typically valued in illumination applications.

Figure 16:
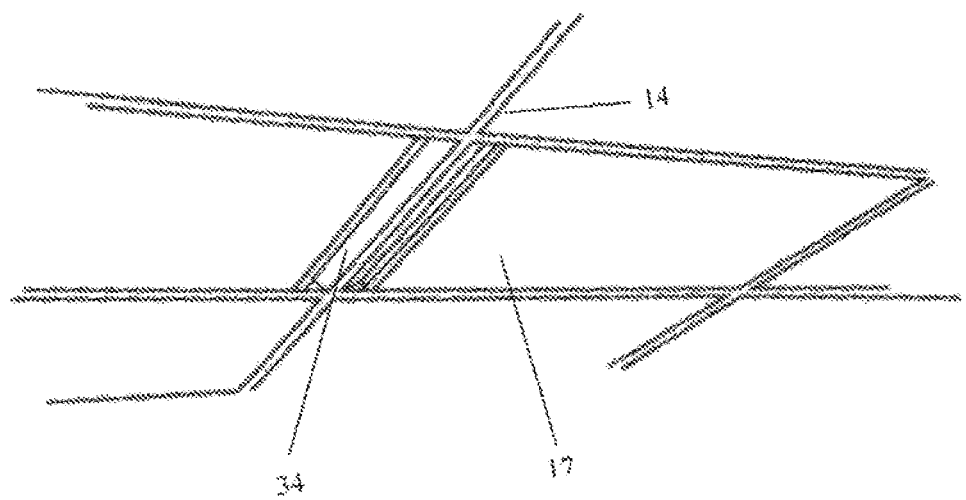
FIG. 16 is an underneath perspective view of an example t-bar lighting assembly installation from within a room looking up at the ceiling.

FIG. 16 is an underneath perspective view of an example t-bar lighting assembly installation from within a room looking up at the ceiling. A t-bar lighting assembly 34 is mounted onto a t-bar 14 flush with the ceiling tile 17.

Figure 17:
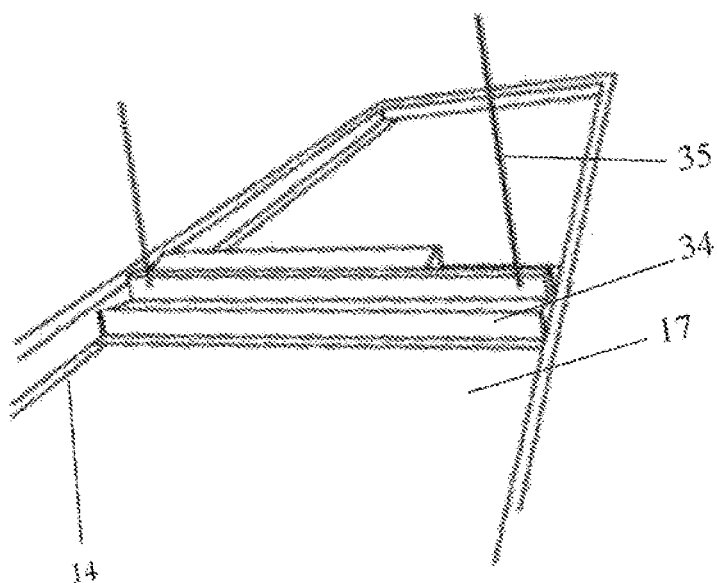
FIG. 17 is an overhead perspective view of a t-bar lighting assembly from above a t-bar grid within a ceiling cavity.

FIG. 17 is an overhead perspective view of a t-bar lighting assembly from above a t-bar grid within a ceiling cavity. A t-bar lighting assembly 34 is mounted onto a t-bar grid (mounting t-bar not visible but adjacent t-bar 14 shown). An optional suspension cable is shown which can be used for extra support and is required by building code in some installation situations.

LIST OF NUMERICAL REFERENCES (Suffix a-h added in detailed description section to indicate specific embodiment)
10 LED board
11 LED
12 light guide
13 light emitting surface
14 t-bar
15 electrical connector
16 extrusion/housing
17 ceiling tile
18 extrusion
19 ledge (of housing/extrusion)
20 clip a
21 light fixture
22 diffusing lens
23 reflective cavity
25 polymer microbeads
27 light directing surface features
30 top aperature
32 side aperature
34 t-bar lighting assembly
35 suspension cable

What is claimed is:
1. A lighting assembly comprising:
a supporting body, the supporting body comprising a portion configured to rest on a portion of a T-bar;
a first light guide supported by the supporting body; and
a light source positioned to emit light into a first outer surface of the first light guide, the emitted light being output through a second outer surface of the first light guide, the second outer surface being adjacent to the first outer surface,
wherein the supporting body comprises a first light guide supporting section extending from a central section of the supporting body to a first outer section of the supporting body, and
wherein the first light guide supporting section supports the first light guide such that the first light guide is oriented at a first oblique angle to a horizontal portion of the T-bar when the lighting assembly is installed on the T-bar.
2. The lighting assembly of claim 1, wherein a first side portion of the first light guide is lower at the central section than a second side portion of the first light guide at the first outer section.
3. The lighting assembly of claim 1, wherein a first side portion of the first light guide is lower at the first outer section than a second side portion of the first light guide at the central section.
4. The lighting assembly of claim 1, wherein the supporting body is supported by the T-bar of the suspension ceiling, such that the portion of the supporting body rests on the horizontal portion of the T-bar.
5. The lighting assembly of claim 1, wherein the supporting body is supported by the T-bar of the suspension ceiling, such that the portion of the supporting body overlaps a portion of a vertical portion of the T-bar.
6. The lighting assembly of claim 1, wherein the supporting body is coupled to the T-bar of the suspension ceiling.
7. The lighting assembly of claim 1, wherein the first outer surface and the second outer surface of the first light guide extend in a longitudinal direction of the lighting assembly.
8. The lighting assembly of claim 1, wherein:
the first outer section of the supporting body is angled towards the central section of the supporting body; and
the light source is positioned to emit light through the first light guide, such that a portion of the emitted light reflects off of the angled first outer section.
9. The lighting assembly of claim 1, wherein the supporting body further comprises a ledge configured to support a ceiling tile, the ledge protruding away from the first outer section of the supporting body.
10. The lighting assembly of claim 1, wherein the first light guide supporting section supports the first light guide by encasing a first side portion of the first light guide and a second side portion of the first light guide.
11. The lighting assembly of claim 1, further comprising a second light guide supported by the supporting body, wherein:
the supporting body further comprises a second light guide supporting section extending from the central section of the supporting body to a second outer section of the supporting body, the second outer section being disposed opposite the first outer section, and
the second light guide supporting section supports the second light guide such that the second light guide is oriented at a second oblique angle to the horizontal portion of the T-bar when the lighting assembly is installed on the T-bar.

12. The lighting assembly of claim 11, wherein the second light guide is oriented at the second oblique angle such that the second light guide is symmetrical to the first light guide.

13. The lighting assembly of claim 11, wherein the first light guide and the second light guide are angled away from one another.

14. The lighting assembly of claim 11, wherein the lighting fixture further comprises:
a second light source positioned to emit light through the second light guide; and
a power source mounted on the lighting assembly and electrically coupled to the light source and the second light source.

15. The lighting assembly of claim 1, wherein:
the first light guide supporting section supports the first light guide by encasing the first outer surface, a third outer surface of the first light guide, a fourth outer surface, and end portions of the second outer surface,
the third outer surface being disposed opposite the second outer surface, and
the fourth outer surface being disposed opposite the first outer surface.

16. The lighting assembly of claim 1, wherein:
the first light guide supporting section encloses the first outer surface, a third outer surface of the first light guide, and an end portion of the second outer surface, and
the third outer surface is disposed opposite the second outer surface.

17. The lighting assembly of claim 1, wherein the first outer surface and the second outer surface each comprise a planar surface.

18. The lighting assembly of claim 1, wherein the first outer surface and the second outer surface are perpendicular to one another.

19. A lighting assembly comprising:
a T-bar of a suspension ceiling, the T-bar having a vertical portion and a horizontal portion extending along a length of the T-bar;
a lighting fixture comprising:
a supporting body, the supporting body comprising a portion configured to rest on a portion of the T-bar;
a first light guide supported by the supporting body; and
a light source positioned to emit light into a first outer surface of the first light guide, the emitted light being output through a second outer surface of the first light guide, the second outer surface being adjacent to the first outer surface,
wherein the supporting body comprises a first light guide supporting section extending from a central section of the supporting body to a first outer section of the supporting body, and
wherein the first light guide supporting section supports the first light guide such that the first light guide is oriented at a first oblique angle to the horizontal portion of the T-bar when the lighting fixture is installed on the T-bar.

20. The lighting assembly of claim 19, wherein a first side portion of the first light guide is lower at the central section than a second side portion of the first light guide at the first outer section.

21. The lighting assembly of claim 19, wherein a first side portion of the first light guide is lower at the first outer section than a second side portion of the first light guide at the central section.

22. The lighting assembly of claim 19, wherein:
the lighting fixture further comprises a second light guide supported by the supporting body,
the supporting body further comprises a second light guide supporting section extending from the central section of the supporting body to a second outer section of the supporting body, the second outer section being disposed opposite the first outer section, and
the second light guide supporting section supports the second light guide such that the second light guide is oriented at a second oblique angle to the horizontal portion of the T-bar when the lighting fixture is installed on the T-bar.

23. The lighting assembly of claim 22, wherein second light guide is oriented at the second oblique angle such that the second light guide is symmetrical to the first light guide.

24. The lighting assembly of claim 22, wherein the first light guide and the second light guide are angled away from one another.

25. The lighting assembly of claim 22, wherein the lighting fixture further comprises:
a second light source positioned to emit light through the second light guide; and
a power source mounted on the lighting fixture and electrically coupled to the light source and the second light source.

26. The lighting assembly of claim 19, wherein
the second outer surface comprises an output face of the first light guide, and
the output face is oriented at the first oblique angle of the first light guide.

27. The lighting assembly of claim 19, wherein the first outer surface and the second outer surface of the first light guide extend in a longitudinal direction of the lighting fixture.

28. The lighting assembly of claim 19, wherein:
the first outer section of the lighting fixture is angled towards the central section of the supporting body, and
the light source is positioned to transmit light through the first light guide, such that a portion of the emitted light reflects off of the angled first outer section.

29. The lighting assembly of claim 19, wherein the first light guide supporting section supports the first light guide by encasing a first side portion of the first light guide and a second side portion of the first light guide.

30. A lighting assembly comprising:
a supporting body, the supporting body comprising a portion configured to rest on a portion of a T-bar of a suspension ceiling;
a light guide supported by the supporting body; and
a light source positioned to emit light into a first outer surface of the light guide, the emitted light being output through a second outer surface of the light guide, the second planar surface being adjacent to the first outer surface,
wherein the supporting body comprises a light guide supporting section extending from a first side of the supporting body to a second side of the supporting body, and
wherein the light guide supporting section supports the light guide such that a first side portion of the light guide is lower at the first side of the supporting body than a second side portion of the light guide at the second side of the supporting body.

31. The lighting assembly of claim 30, wherein the light guide supporting section supports the light guide such that the light guide is oriented at an oblique angle to a horizontal portion of the T-bar when the lighting assembly is installed on the T-bar.

32. The lighting assembly of claim 30, wherein the supporting body further comprises a mount configured to overlap a portion of a vertical portion of the T-bar, the mount extending outwards from a rear of the supporting body.

33. The lighting assembly of claim 30, wherein:
a portion of the second side of the supporting body is angled towards the first side of the supporting body.

34. The lighting assembly of claim 30, wherein the second outer surface comprises an output face of the light guide.

35. The lighting assembly of claim 30, wherein the supporting body further comprises a ledge configured to support a ceiling tile, the ledge protruding away from the second side of the supporting body.

36. The lighting assembly of claim 30, wherein the supporting body is coupled to the T-bar of the suspension ceiling.

37. A lighting assembly comprising:
a supporting body;
a first light guide and a second light guide supported by the supporting body; and
a first light source positioned to emit light into a first outer surface of the first light guide, the emitted light being output through a second outer surface of the first light guide, the second outer surface being adjacent to the first outer surface,
wherein the supporting body comprises:
a longitudinally extending central section disposed between a first outer section and a second outer section, at least a portion of the central section is configured to rest on a portion of a T-bar of a suspension ceiling, and the second outer section being disposed opposite the first outer section, and
a first ledge disposed on the first outer section of the supporting body, and a second ledge disposed on the second outer section of the supporting body, the first ledge being configured to support a first ceiling tile, and the second ledge being configured to support a second ceiling tile
wherein the supporting body is configured to dispose the first light guide and the second light guide on opposite sides of the T-bar such that, when the lighting assembly is installed on the T-bar, the first light guide is disposed between the first ceiling tile and the T-bar and the second light guide is disposed between the second ceiling tile and the T-bar.

38. The light assembly of claim 37, wherein:
the central section comprises:
two upright portions extending in a vertical direction of the supporting body; and
a mounting portion that couples together the two upright portions, and
when the lighting assembly is installed on the T-bar, the two upright portions are disposed on opposite sides of a vertical portion of the T-bar and the mounting portion is disposed above a horizontal portion of the T-bar.

39. The lighting assembly of claim 37, wherein:
the supporting body comprises a light guide supporting section extending from the central section of the supporting body to the first outer section of the supporting body, and
the light guide supporting section supports the light guide such that a first side portion of the light guide is lower at the central section than a second side portion of the light guide at the first outer section.

40. The lighting assembly of claim 39, wherein the light guide supporting section supports the light guide such that the light guide is oriented at an oblique angle to a horizontal portion of the T-bar when the lighting assembly is installed on the T-bar.

41. The lighting assembly of claim 37, wherein the supporting body is coupled to the T-bar of the suspension ceiling.

42. The lighting assembly of claim 37, further comprising:
a second light source positioned to transmit light through the second light guide; and
a power source mounted on the lighting fixture and electrically coupled to the light source and the second light source.

43. The lighting assembly of claim 37, further comprising a second light source positioned to emit light into a third outer surface of the second light guide, the emitted light being output through a fourth outer surface of the second light guide, the fourth outer surface being adjacent to the third outer surface.

* * * * *